June 13, 1944. H. E. HODGSON 2,351,211

DRIVE FOR VALVES AND THE LIKE

Filed June 29, 1942

Inventor
Howard E. Hodgson
By Frank H. Hubbard
Attorney

Patented June 13, 1944

2,351,211

UNITED STATES PATENT OFFICE 2,351,211

DRIVE FOR VALVES AND THE LIKE

Howard E. Hodgson, Wauwatosa, Wis., assignor to Cutler-Hammer, Inc., Milwaukee, Wis., a corporation of Delaware Application June 29, 1942, Serial No. 448,962

3 Claims. (Cl. 74—424.8)

This invention relates to drives for valves and the like.

The invention relates more particularly to drives for valves having a non-rotatable threaded stem and a coacting rotatable nut, the drive having associated therewith a thrust responsive spring mechanism to take the thrust of the nut when it tends to move axially upon seating of the valve or upon expansion or contraction of the valve parts after seating of the valve.

The co-pending application of Howard E. Hodgson et al., Serial No. 267,142, filed April 10, 1939, discloses a valve operating unit of the aforesaid character in which the driving mechanism and the thrust responsive mechanism are embodied in a unitary structure for top mounting upon the valve yoke and the valve nut is rotatably and slidably supported within an opening in the valve yoke and is operatively connected to the driving mechanism of the unit by means of jaw couplings.

The present invention may be regarded as an improvement of the valve driving mechanism disclosed in the aforementioned application, and the same has among its objects to embody the valve driving mechanism, the thrust responsive mechanism and the valve operating nut in a unit which is exceedingly simple, rugged and compact in construction.

Another object is to provide a valve operating unit of the aforesaid character in which the valve operating nut serves as an operating spindle for the unit and is coupled directly to the gear drive of the unit.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

Figure 1:
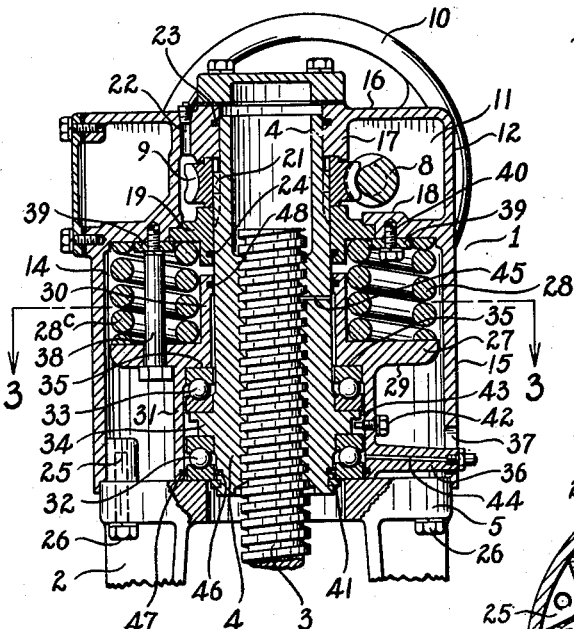
Figure 1 is a longitudinal sectional view of a valve operating unit embodying the invention.

Referring to Fig. 1, the same illustrates a valve operating unit 1 embodying the invention, said unit being adapted for top mounting upon the yoke 2 of a valve having a non-rotatable threaded operating stem 3 and an associated rotatable operating nut 4. The top of valve yoke 2 is provided with a circular flange 5 concentric to the axis of stem 3 and nut 4 comprises an elongated internally threaded sleeve which serves as an operating spindle for the unit.

Figure 2:
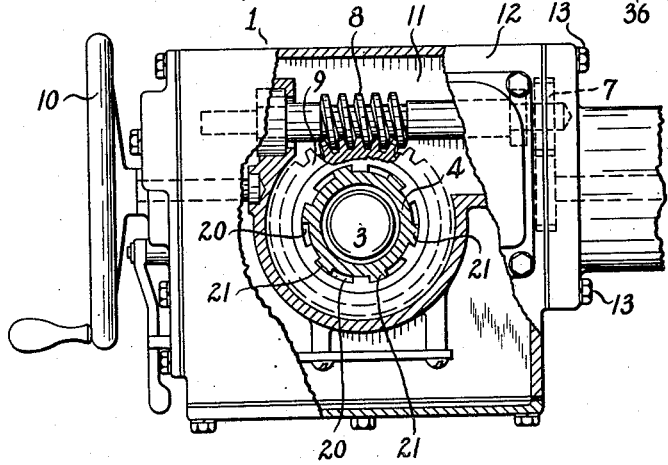
Fig. 2 is a plan view of the unit shown in Fig. 1 with portions of the unit broken away and shown in section.

As shown in Fig. 2, unit 1 is provided with a drive mechanism comprising a motor 6 which drives, through gearing 7, a worm 8 meshing with a worm wheel 9. Alternatively the worm 8 may be operated by a hand wheel 10 through suitable gearing (not shown) which may be rendered effective and ineffective by a control mechanism of the type disclosed in the aforementioned Hodgson et al. application. The gears mentioned are housed within a chamber 11 formed within a casing 12 to which the motor 6 is suitably secured by bolts 13. Sleeve nut 4 is operatively connected to worm wheel 9 and has a thrust responsive spring mechanism 14 associated therewith which is mounted within a chamber formed by a downwardly extending circular skirt 15 on the under side of casing 12.

More specifically, the top wall 16 of casing 12 is provided with a bearing projection 17 which is bored to receive the upper end of sleeve nut 4 and the bottom wall 18 of said casing is bored to receive a circular bearing plate 19 having a center bearing opening therein for sleeve nut 4. Worm wheel 9 is rotatably supported and held against axial movement between bearing projection 17 and bearing plate 19, and as shown in Fig. 2 said worm wheel is provided with a hub portion having a splined opening 20 therein for receiving a splined portion 21 on sleeve nut 4. Sleeve nut 4 is slidable axially within the worm wheel 9 and the splined portion 21 on said nut engages within the splined opening 20 in said worm wheel to provide a lost motion driving connection between said worm wheel and said nut.

The gear chamber 11 in casing 12 is filled with a suitable gear lubricant through an opening 22 in the top wall of casing 12 and bearing projection 17 and bearing plate 19 are recessed to receive oil retaining rings 23 and 24, respectively, which surround nut 4 to prevent leakage of the lubricant contained in said chamber.

Figure 3:
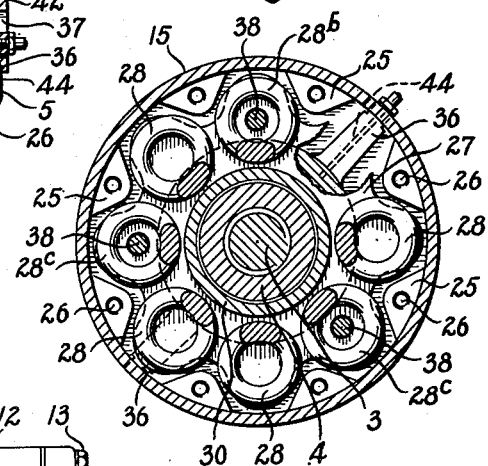
Fig. 3 is a horizontal sectional view taken substantially on line 3—3 of Fig. 1.

The skirt 15 of casing 12 has its lower end counterbored to receive flange 5 of the valve yoke 2 and as shown in Figs. 1 and 3 the lower end of said skirt is provided with eight equally spaced, inwardly extending lugs 25 for engaging the upper face of said flange. Casing 11 is secured to flange 5 by cap screws 26 which pass through openings in said flange into tapped openings in the lugs 25.

The thrust-responsive spring mechanism 14 associated with nut 4 comprises an annular thrust member 27 and a series of eight equally spaced vertically arranged helical springs 28 which are held under compression between said thrust member and the lower wall 18 of casing 12. As shown in Fig. 3, the periphery of thrust member 27 is notched to clear the lugs 25 on the lower end of skirt 15, and the same is provided with an upwardly extending sleeve projection 30 which loosely surrounds the sleeve nut 4, and a downwardly extending sleeve projection 31 which contains a pair of ball thrust bearings 32 and 33. Bearing 32 is interposed between the upper face of yoke flange 5 and an outwardly extending peripheral flange 34 on nut 4 and bearing 33 is interposed between said flange and the shoulder 35 on the underside of thrust member 27.

Sleeve projection 31 on thrust member 27 is provided with a pair of oppositely disposed outwardly extending arms 36 which engage within slots 37 in the lower end of skirt 15 to hold said thrust member against rotation. Thrust member 27 and springs 28 are held in assembled position upon the lower wall 18 of casing 12 by three spaced studs 38 which are located (as shown in Fig. 3) within the thrust springs 28ª, 28ᵇ and 28ᶜ. The upper ends of the studs 38 screw into tapped openings in wall 18 of the casing and the lower ends of said studs are provided with heads for engaging the underside of thrust member 27. Each of the springs 28 has a washer 39 associated therewith for holding the same against lateral displacement and said washers also serve to hold bearing plate 19 in assembled position upon casing 12. The washers 39 associated with springs 28ª, 28ᵇ and 28ᶜ are secured to casing wall 18 by the studs 38 and the washers associated with the other springs 28 are secured to said wall by screws 40.

The lower thrust bearing 32 is held in assembled position upon nut 4 by a split ring 41 held within a recess in said nut, and said nut and its associated thrust bearings 32 and 33 are held in assembled position within thrust member 27 by a screw 42.

From the foregoing it is apparent that nut 4 is adapted to be driven in opposite directions by motor 6 through the medium of the aforedescribed gearing to effect opening and closure of the valve, and it should be noted that the lost motion driving connection between gear 9 and said nut provides for starting of the nut in opposite directions with a hammer blow. Upon operation of motor 6 in valve opening direction nut 4 tends to move downwardly but is held in the position shown in Fig. 1 by the thrust bearing 32. Upon operation of motor 6 in a direction to effect closure of the valve sleeve nut 4 tends to move upwardly but is normally held in the position shown in Fig. 1 by thrust member 27 and its associated springs 28. However, when valve stem 3 is subjected to a predetermined thrust upon seating of the valve, nut 4 and its associated thrust member 27 move upwardly against the action of springs 28. Upward movement of thrust member 27 against the action of springs 28 is limited by engagement of the upper end of sleeve projection 30 on said thrust member with the underside of bearing plate 19.

As shown in Fig. 1, one of the arms 36 of thrust member 27 is drilled to provide a passage 44 for introducing a lubricant from the outer end of said arm into the space within sleeve projection 31, and nut 4 is provided with a radial oil passage 45 which is located adjacent the upper end of sleeve projection 30 on thrust member 27. The lower end of nut 4 and the lower end of sleeve 32 are recessed to receive oil retaining rings 46 and 47, respectively, which engage on opposite sides of the lower race of ball bearing 32 and the upper end of sleeve projection 30 on thrust member 27 is recessed to receive an oil retaining ring 48 which closely surrounds the sleeve nut 4. The space which contains the thrust bearings 32 and 33 is thus sealed to prevent leakage of the lubricant contained therein and the lubricant contained in such space is adapted to enter through the oil passage 45 in nut 4 to lubricate stem 3 and the interior of said nut.

In connection with the foregoing it should be noted that the gear driving mechanism and nut 4 and its associated thrust responsive mechanism 14 are mounted within casing 12 to provide a self-contained unit which can be readily mounted upon existing types of valves with little or no modification of the valve structure. As is apparent upon removal of cap screws 26 the unit is removable from the valve by rotation of nut 4 in a direction to disengage the same from valve stem 3. Furthermore it should be noted that the unit is exceedingly simple in construction and is advantageous in that the valve nut serves as a driving spindle for the unit.

What I claim as new and desire to secure by Letters Patent is:

1. In an operating unit for a valve having an axially movable non-rotatable threaded stem and a yoke through which said stem extends, in combination, an enclosing casing having a skirt on the underside thereof to rest upon and to be secured to the valve yoke, an internally threaded elongated sleeve nut mounted upon said stem and rotatable to move said stem axially, said sleeve nut being rotatably supported by spaced bearings located within said casing and being capable of limited axial movement from a normal position in a direction away from the valve yoke, a motor carried by said casing, a speed reducing gear drive between said motor and said nut, said drive being located within said casing and including a slow speed gear held against axial movement between said bearing parts and having a splined driving connection between the same and said nut to permit the aforementioned axial movement of said nut, and a spring thrust mechanism comprising an annular thrust member held against rotative movement by the skirt on the underside of said casing and supported upon said sleeve to move axially therewith, and a plurality of coil springs mounted to bear against said thrust member at points around the valve nut to resist the aforementioned limited movement of said valve nut.

2. In an operating unit for a valve having an axially movable non-rotatable threaded stem and a yoke through which said stem extends, an enclosing casing having a skirt formed on the underside thereof to rest upon and to be detachably secured to the valve yoke, an internally threaded sleeve nut for receiving the valve stem to operate the same, said sleeve nut being rotatably and slidably supported within said casing and extending downwardly from said casing to the lower end of said skirt, a speed reducing gear drive mounted within said casing and including a worm wheel surrounding said sleeve nut and splined thereto whereby said sleeve nut is permitted axial movement in said casing independently of said worm wheel, and a spring thrust mechanism located within the skirt portion of said casing for opposing axial movement of said nut in said casing in a direction away from the valve yoke during valve operation, said thrust mechanism being supported on the under side of said casing and said sleeve nut being supported by said thrust mechanism to hold said thrust mechanism and said sleeve nut in assembled relation within said casing upon removal of said casing from the valve yoke.

3. In an operating unit for a valve having an axially movable non-rotatable threaded stem and a yoke through which said stem extends, in combination, an enclosing casing having a skirt formed on the underside thereof to rest upon and to be detachably secured to the valve yoke, an internally threaded sleeve nut for receiving the valve stem to operate the same, said sleeve nut being rotatably and slidably supported by bearings within said casing and extending downwardly from said casing to the lower end of said skirt, a speed reducing gear drive mounted within said casing and including a worm wheel surrounding said sleeve nut and splined thereto whereby said sleeve nut is permitted axial movement in said casing independently of said worm wheel, a non-rotatable thrust member of annular form surrounding said sleeve nut and having a thrust bearing associated with the underside thereof for supporting the same upon the lower end of said sleeve nut and a plurality of coil springs located above said thrust member and interposed between said thrust member and the underside of said casing to oppose axial movement of said nut in said casing in a direction away from the valve yoke during valve operation, said thrust member and said springs being supported on the underside of said enclosing casing and said sleeve nut being supported by said thrust member to hold said thrust member, said springs and said sleeve nut in assembled relation within said casing upon removal of said casing from the valve yoke.

HOWARD E. HODGSON.